United States Patent
Terasawa et al.

(10) Patent No.: US 9,973,089 B1
(45) Date of Patent: May 15, 2018

(54) INTERLEAVED DC-DC CONVERTER AND SEMICONDUCTOR DEVICE HAVING INTERLEAVED DC-DC CONVERTER

(71) Applicant: SANKEN ELECTRIC CO., LTD., Niiza-Shi, Saitama (JP)

(72) Inventors: Youichi Terasawa, Tokyo (JP); Yoshimichi Tadamasa, Miyoshi-Machi (JP); Akira Ichinose, Fujimi (JP); Satoshi Nakamoto, Fujimi (JP)

(73) Assignee: SANKEN ELECTRIC CO., LTD., Niiza-shi (JP)

( * ) Notice: Subject to any disclaimer, the term of this patent is extended or adjusted under 35 U.S.C. 154(b) by 0 days. days.

(21) Appl. No.: 15/492,530

(22) Filed: Apr. 20, 2017

(51) Int. Cl.
| | |
|---|---|
| *H02M 3/158* | (2006.01) |
| *H02M 1/08* | (2006.01) |
| *H02M 1/42* | (2007.01) |
| *H02M 1/36* | (2007.01) |
| *H02M 1/00* | (2006.01) |

(52) U.S. Cl.
CPC ............ *H02M 3/158* (2013.01); *H02M 1/08* (2013.01); *H02M 1/36* (2013.01); *H02M 1/42* (2013.01); *H02M 2001/0009* (2013.01)

(58) Field of Classification Search
CPC .......... H02M 3/158; H02M 1/36; H02M 1/08; H02M 1/42; H02M 2001/0009
USPC ........................................ 323/271
See application file for complete search history.

(56) References Cited

U.S. PATENT DOCUMENTS

| 7,301,400 B1* | 11/2007 | Dening ................ H03F 1/0227 |
| | | 323/272 |
| 7,706,151 B2* | 4/2010 | Neidorff ............. H02M 1/4216 |
| | | 363/9 |
| 7,884,588 B2* | 2/2011 | Adragna ............. H02M 3/1584 |
| | | 323/272 |

(Continued)

FOREIGN PATENT DOCUMENTS

| JP | 5402268 B2 | 1/2014 |
| JP | 5424804 B2 | 2/2014 |

OTHER PUBLICATIONS

Received STIC search report from EIC 2800 searcher Benjamin Martin on Aug. 14, 2017.*

*Primary Examiner* — Timothy J Dole
*Assistant Examiner* — Htet Z Kyaw
(74) *Attorney, Agent, or Firm* — Metrolexis Law Group, PLLC

(57) ABSTRACT

An interleaved DC-DC converter according to one or more embodiments includes a control circuit and N boost converters that are connected in parallel. The control circuit includes: an output voltage detection circuit that compares a detected voltage with a reference voltage, and outputs a comparison result as an error signal; N PWM generators that respectively generate pulses that on/off drive switching elements of the N converters; N current error amplifiers that compare current signals detected by respective current detectors with the error signal, and that outputs comparison results as feedback signals to the respective PWM generators; a differential detector that detects a difference between one feedback signal and another feedback signal for each of the feedback signals; and a latch circuit that stops all switching operations of the N converters when the differential detector detects that any one of the differences is a predetermined threshold value or more.

17 Claims, 10 Drawing Sheets

(56) References Cited

U.S. PATENT DOCUMENTS

| | | | | |
|---|---|---|---|---|
| 8,098,505 | B1* | 1/2012 | Choi | H02M 1/4225 |
| | | | | 323/272 |
| 8,212,539 | B2* | 7/2012 | Osaka | H02M 3/1584 |
| | | | | 323/222 |
| 8,248,040 | B2* | 8/2012 | Rausch | H02M 1/4225 |
| | | | | 323/207 |
| 8,476,879 | B2* | 7/2013 | Gaboury | H02M 1/4225 |
| | | | | 323/207 |
| 8,482,948 | B2* | 7/2013 | Chen | H02M 3/1584 |
| | | | | 363/72 |
| 2005/0162143 | A1* | 7/2005 | Fukumoto | H02M 1/4225 |
| | | | | 323/284 |
| 2006/0043943 | A1* | 3/2006 | Huang | H02M 3/158 |
| | | | | 323/222 |
| 2011/0234195 | A1* | 9/2011 | Suzuki | H02M 3/07 |
| | | | | 323/311 |

* cited by examiner

INTERLEAVED DC-DC CONVERTER AND SEMICONDUCTOR DEVICE HAVING INTERLEAVED DC-DC CONVERTER

BACKGROUND

The disclosure relates to an interleaved DC-DC converter including multiple boost converters that are connected in parallel and to a semiconductor device having the interleaved DC-DC converter.

Interleaved DC-DC converters of the related art each include multiple boost converters that are connected in parallel. For example, Japanese Patent No. 5402268 (Patent Literature 1) discloses an interleaved DC-DC converter in which two converters perform switching operations in mutually shifted phases.

The interleaved DC-DC converter disclosed in Patent Literature 1 includes a master-side switching element QM, a slave-side switching element QM, a master-side control circuit, and a slave-side control circuit. In the interleaved DC-DC converter disclosed in Patent Literature 1, the master-side control circuit outputs a master signal to the master-side switching element QM and the slave-side control circuit outputs a slave signal to the slave-side switching element QM. The phase of the master signal and the phase of the slave signal are shifted by 180 degrees each other. The master-side converter and the slave-side converter perform switching operations according to the master signal and the slave signal, respectively. A ripple voltage(current) in the output voltage(current) from the master-side converter and a ripple voltage(current) in the output voltage(current) from the slave-side converter are canceled with each other.

SUMMARY

An interleaved DC-DC converter according to one or more embodiments converts a first voltage of a DC input power supply into a second voltage and outputs the second voltage. The interleaved DC-DC converter includes: N (where N is an integer of 2 or more) boost converters that are connected in parallel, switching cycles of the N converters being mutually shifted by 1/N phase; a smoothing capacitor that is connected to an output terminal; and a control circuit that independently controls switching operations of the N converters. Each of the N converters includes a series circuit of a reactor, a switching element, and a current detector, and a node between the reactor and the switching element is connected to the smoothing capacitor via a corresponding diode. The control circuit includes: an output voltage detection circuit that detects a voltage of the smoothing capacitor, compares the detected voltage with a reference voltage, and outputs a comparison result as an error signal; a single oscillator that provides clock signals of mutually different phases to the N converters, the oscillator being common in the N converters; N PWM generators that respectively generate pulses that on/off drive the switching elements of the N converters; N current error amplifiers that compare current signals detected by the respective current detectors with the error signal outputted from the output voltage detection circuit, and that outputs comparison results as feedback signals to the respective PWM generators; a differential detector that detects a difference between one feedback signal and another feedback signal for each of the feedback signals; and a latch circuit that stops all the switching operations of the N converters when the differential detector detects that any one of the differences is a predetermined threshold value or more.

In an interleaved DC-DC converter according to one or more embodiments, N (where N is an integer of 2 or more) boost DC-DC converters are connected in parallel. The interleaved DC-DC converter includes: N PWM generators that respectively output PWM signals to N switching elements included in the N DC-DC converters; a voltage error detection circuit that detects a difference between an output voltage after conversion and a reference voltage; N current detection circuits that respectively detect currents of the N switching elements; N current error amplifiers that output feedback signals for adjusting duty ratios of the PWM signals, to the PWM generators such that the currents detected by the respective current detection circuits and the difference detected by the voltage error detection circuit become zero; a difference detection circuit that detects a difference between one feedback signal and another feedback signal, for each of the feedback signals; and a control circuit that permanently stops switching operations of the N DC-DC converters when any one of the differences detected by the difference detection circuit is a predetermined threshold value or more.

A semiconductor device according to one or more embodiments includes the interleaved DC-DC converter. At least the switching elements and the control circuit are implemented as an integrated circuit. The diodes may be implemented as the integrated circuit.

DETAILED DESCRIPTION

Figure 1:
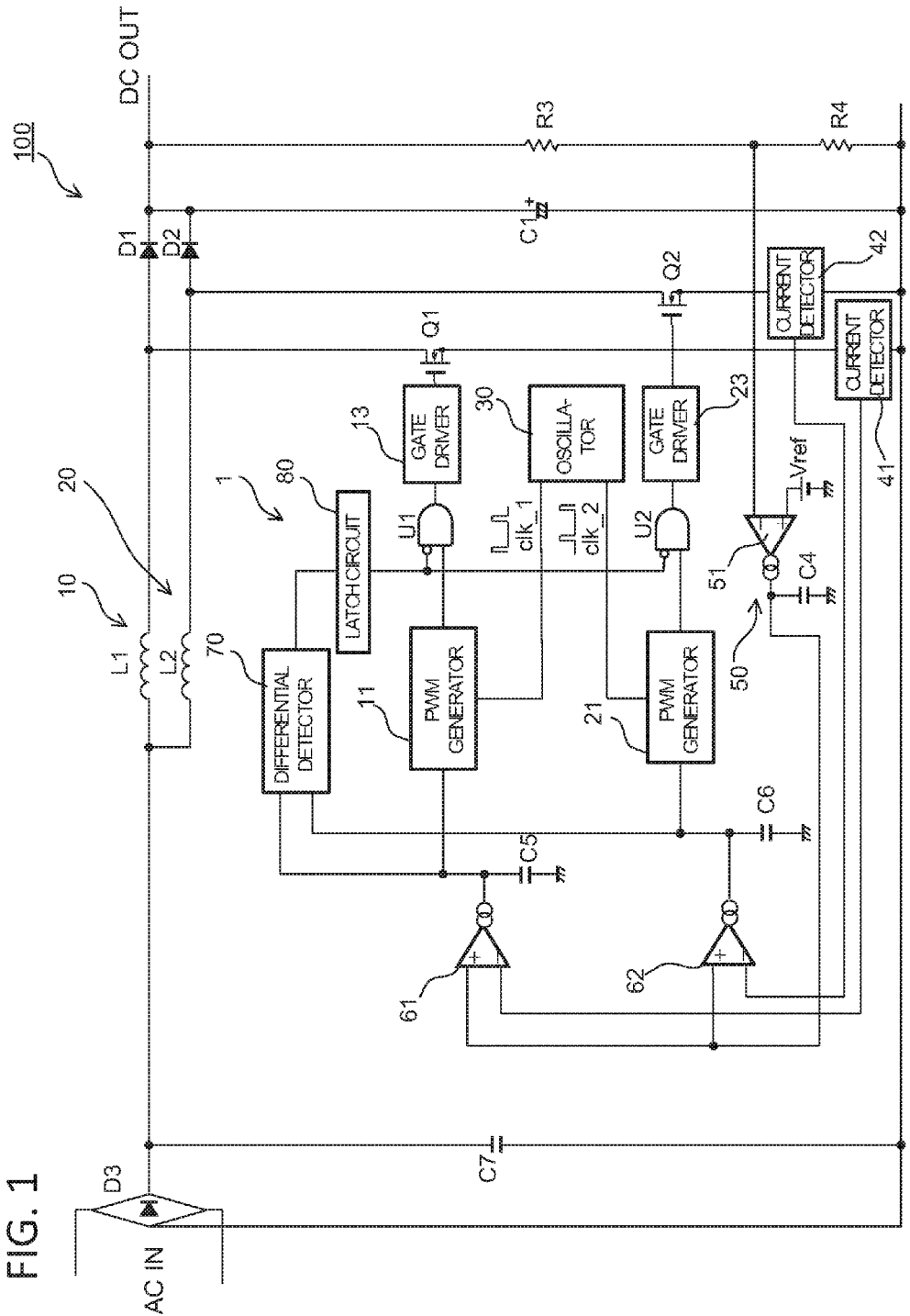
FIG. 1 is a diagram illustrating a circuit block of a DC-DC converter according to one or more embodiments.

Embodiments are explained with reference to drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on one or more embodiments. For this reason, specific dimensions and the like should be interpreted with the following descriptions taken into consideration. In addition, the drawings may include parts whose dimensional relationship and ratios are different from one drawing to another.

It should be noted that an interleaved DC-DC converter is simply referred to as a DC-DC converter in the following explanation.

1. Configuration of DC-DC Converter 100

Figure 2:
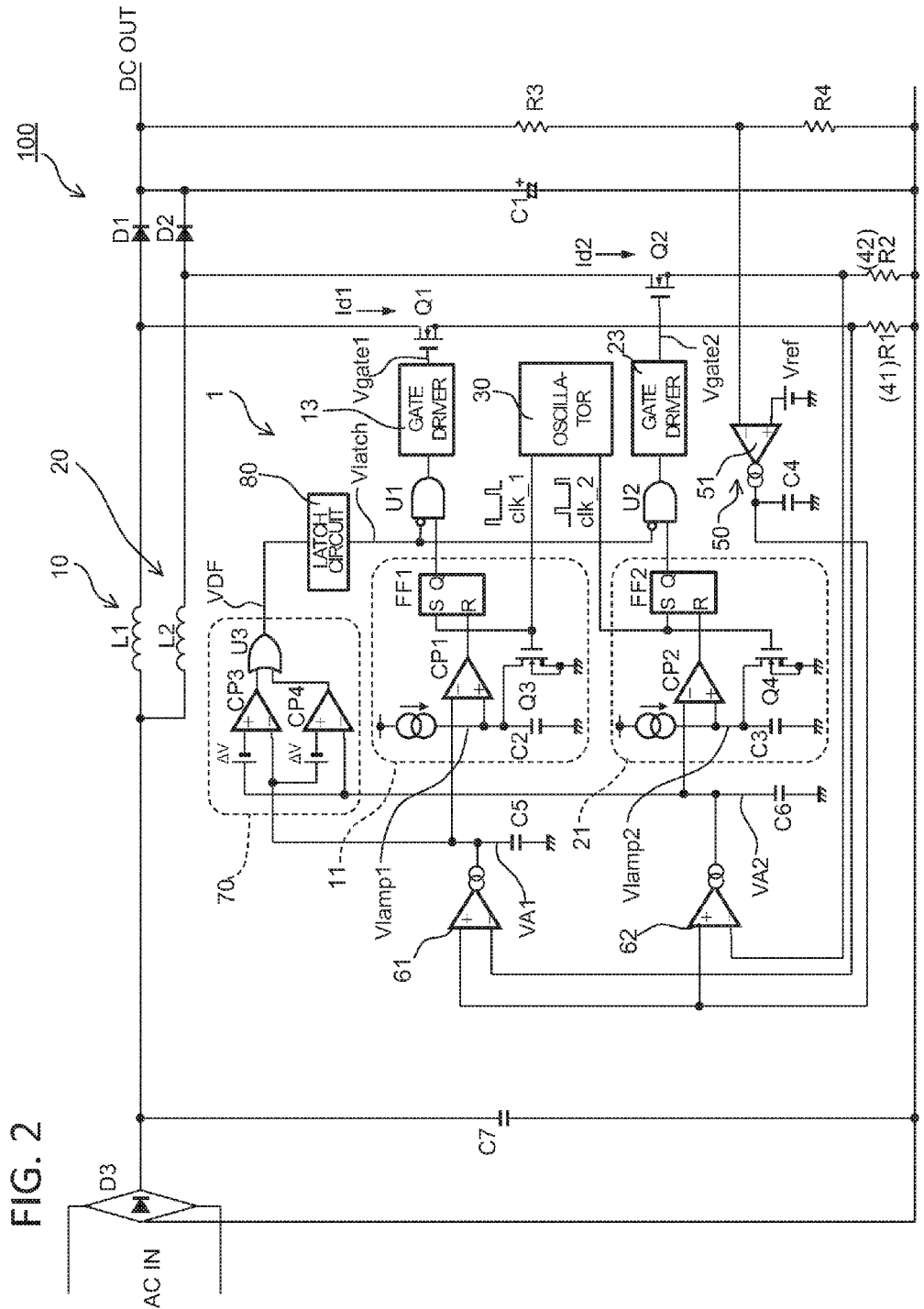
FIG. 2 is a diagram illustrating a circuit example of the DC-DC converter.

FIG. 1 is a circuit block diagram of DC-DC converter 100 according to one or more embodiments. FIG. 2 is a diagram illustrating a specific circuit example of DC-DC converter 100. DC-DC converter 100 includes bridge diode D3, boost converter 10, boost converter 20, output side smoothing capacitor C1, and input side smoothing capacitor C7. DC-DC converter 100 converts a DC voltage that is obtained by AC power supply AC IN being converted, into DC voltage DC OUT. Switching operations by converter 10 and converter 20 are independently controlled.

Bridge diode D3 rectifies an output from the AC power supply AC IN. Input side smoothing capacitor C7 smoothes a DC current outputted from bridge diode D3. The smoothed DC power supply is inputted into converter 10 and converter 20.

Converter 10 includes reactor L1 and switching element Q1. Reactor L1 and switching element Q1 are connected to each other in series. A node between reactor L1 and switching element Q1 is connected to a positive electrode of output side smoothing capacitor C1 via diode D1. Converter 20 includes reactor L2 and switching element Q2. A node between reactor L2 and switching element Q2 is connected to a positive electrode of output side smoothing capacitor C1 via diode D2. Reactors L1 and L2 are choke coils, for example. Switching elements Q1 and Q2 are MOSFETs, for example.

Converter 10 includes PWM generator 11, gate driver 13, current detector 41, and current error amplifier 61, for the control of a switching operation. Converter 20 includes PWM generator 21, gate driver 23, current detector 42, and current error amplifier 62, for the control of a switching operation.

DC-DC converter 100 includes oscillator 30 and output voltage detection circuit 50, for the control of the respective switching operations of converter 10 and converter 20. Output voltage detection circuit 50 corresponds to a voltage error amplifier circuit. Oscillator 30 and output voltage detection circuit 50 are shared by converter 10 and converter 20. It should be noted that oscillator 30, current detectors 41 and 42, PWM generators 11 and 21, output voltage detection circuit 50, current error amplifiers 61 and 62, and gate drivers 13 and 23 constitute a part of control circuit 1 of DC-DC converter 100.

Oscillator 30 outputs pulse-like clock signal Clk_1 to PWM generator 11. Oscillator 30 outputs clock signal Clk_2 to PWM generator 21. Clock signal Clk_1 and clock signal Clk_2 have phases that are mutually different by 180 degrees (1/N phase).

Output voltage detection circuit 50 includes resistance R3, resistance R4, voltage error amplifier 51, and capacitor C4. Capacitor C4 is connected between an output terminal of voltage error amplifier 51 and a ground potential. Moreover, the output terminal of voltage error amplifier 51 is connected to a non-inverting input terminal of current error amplifier 61 and a non-inverting input terminal of current error amplifier 62. Reference voltage Vref is inputted into a non-inverting input terminal of voltage error amplifier 51. A divided voltage value obtained by dividing output voltage DC OUT (corresponding to the voltage of output side smoothing capacitor C1) by resistance R3 and resistance R4 is inputted into an inverting input terminal of voltage error amplifier 51. Voltage error amplifier 51 amplifies a difference between reference voltage Vref and the divided voltage value.

PWM generator 11 outputs, based on inputted clock signal Clk_1, a PWM signal to gate driver 13. PWM generator 21 outputs, based on inputted clock signal Clk_2, a PWM signal to gate driver 23. An on/off drive of switching element Q1 is controlled based on the PWM signal outputted from PWM generator 11. An on/off drive of switching element Q2 is controlled based on the PWM signal outputted from PWM generator 21. The duty ratio of the PWM signal generated by PWM generator 11 changes based on an output from current error amplifier 61. The duty ratio of the PWM signal generated by PWM generator 21 changes based on an output from current error amplifier 62. A detail of the change in the duty ratio is described later.

As illustrated in FIG. 2, PWM generator 11 includes comparator CP1, flip-flop FF1, capacitor C2, and switching element Q3. An inverting input terminal of comparator CP1 is connected to an output terminal of current error amplifier 61. A non-inverting input terminal of comparator CP1 is connected to a DC power supply. The non-inverting input terminal of comparator CP1 is grounded via capacitor C2. A connection end of the non-inverting input terminal of comparator CP1 and capacitor C2 is connected to a drain of switching element Q3. A source of switching element Q3 is grounded. Clock signal Clk_1 outputted from oscillator 30 is inputted into a gate of switching element Q3. Clock signal Clk_1 is also inputted into input terminal S of flip-flop FF1. The output terminal of comparator CP1 is connected to input terminal R of flip-flop FF1. An output terminal of flip-flop FF1 is connected to gate driver 13 via AND gate U1, which is described later.

As illustrated in FIG. 2, PWM generator 21 includes comparator CP2, flip-flop FF2, capacitor C3, and switching element Q4. An inverting input terminal of comparator CP2 is connected to an output terminal of current error amplifier 62. A non-inverting input terminal of comparator CP2 is connected to a DC power supply. The non-inverting input terminal of comparator CP2 is grounded via capacitor C3. A connection end of the non-inverting input terminal of comparator CP2 and capacitor C3 is connected to a drain of switching element Q4. A source of switching element Q4 is grounded. Clock signal Clk_2 outputted from oscillator 30 is inputted into a gate of switching element Q4. Clock signal Clk_2 is also inputted into input terminal S of flip-flop FF2. The output terminal of comparator CP2 is connected to input terminal R of flip-flop FF2. An output terminal of flip-flop FF2 is connected to gate driver 23 via AND gate U2, which is described later.

Gate driver 13 controls a gate voltage of switching element Q1, based on the inputted PWM signal. This causes switching element Q1 to on/off drive. That is to say, gate driver 13 controls on/off of switching element Q1. Gate driver 23 controls a gate voltage of switching element Q2, based on the inputted PWM signal. This causes switching element Q2 to on/off drive. That is to say, gate driver 23 controls on/off of switching element Q2.

Current detector 41 constitutes a series circuit with reactor L1 and switching element Q1. Current detector 41 detects a source-drain current Id1 of switching element Q1. A detection value (corresponding to a current signal) by current detector 41 is inputted into an inverting input terminal of current error amplifier 61. Current detector 42 constitutes a series circuit with reactor L2 and switching element Q2. Current detector 42 detects a source-drain current Id2 of switching element Q2. A detection value (corresponding to a current signal) by current detector 42 is inputted into an inverting input terminal of current error amplifier 62. As illustrated in FIG. 2, specifically, current detector 41 includes resistance R1. Current detector 42 includes resistance R2. Resistance R1 includes one end connected to a source of switching element Q1 and the other end connected to a negative electrode of output voltage DC OUT. One end of resistance R1 is also connected to the inverting input terminal of current error amplifier 61. Resistance R2 includes one end connected to a source of switching element Q2 and the other end connected to the negative electrode of output voltage DC OUT. One end of resistance R2 is also connected to the inverting input terminal of current error amplifier 62.

The output terminal of current error amplifier 61 is grounded via capacitor C5, and is connected to PWM generator 11. Current error amplifier 61 amplifies a difference between a detection value by current detector 41 and a detection value by output voltage detection circuit 50. Current error amplifier 61 outputs the amplified difference to PWM generator 11. This amplified difference corresponds to a feedback signal for adjusting the duty ratio of the pulse signal generated by PWM generator 11. The output terminal of current error amplifier 62 is grounded via capacitor C6, and is connected to PWM generator 21. Current error amplifier 62 amplifies a difference between a detection value by current detector 42 and a detection value by output voltage detection circuit 50. Current error amplifier 62 outputs the amplified difference to PWM generator 21. This amplified difference corresponds to a feedback signal for adjusting the duty ratio of the pulse signal generated by PWM generator 21.

Control circuit 1 of DC-DC converter 100 further includes differential detector 70, latch circuit 80, AND gate U1, and AND gate U2. It should be noted that control circuit 1, diodes D1 and D2, and switching elements Q1 and Q2 may be implemented as an integrated circuit in a semiconductor device.

As illustrated in FIG. 2, differential detector 70 includes comparator CP3, comparator CP4, and OR gate U3. Comparator CP3 and comparator CP4 correspond to a comparison unit. A non-inverting input terminal of comparator CP3 is connected to the output terminal of current error amplifier 62 via a DC power supply having threshold voltage ΔV. This causes the voltage that is reduced by threshold voltage ΔV of this DC power supply from the output voltage from the current error amplifier 62 to be inputted into the non-inverting input terminal of comparator CP3. An inverting input terminal of comparator CP3 is connected to the output terminal of current error amplifier 61. In other words, the comparator CP3 compares the output voltage from current error amplifier 61 with the voltage that is smaller by threshold voltage ΔV than the output voltage from current error amplifier 62, with this configuration. A non-inverting input terminal of comparator CP4 is connected to the output terminal of current error amplifier 61 via a DC power supply having threshold voltage ΔV. The voltage that is reduced by threshold voltage ΔV of this DC power supply from the output voltage from the current error amplifier 61 is inputted into a non-inverting input terminal of comparator CP4. An inverting input terminal of comparator CP4 is connected to the output terminal of current error amplifier 62. In other words, the comparator CP4 compares the output voltage from current error amplifier 62 with the voltage that is smaller by threshold voltage ΔV than the output voltage from current error amplifier 61. Outputs from comparator CP3 and output of comparator CP4 are inputted into OR gate U3. OR gate U3 outputs logical addition VDF of the two inputs to latch circuit 80.

Latch circuit 80 includes, for example, a flip-flop including information of 1 bit. An output from latch circuit 80 is inverted, and then is inputted into AND gate U1 and AND gate U2. The output from flip-flop FF1 in PWM generator 11 is further inputted into AND gate U1. An output from flip-flop FF2 in PWM generator 21 is further inputted into AND gate U2. An output terminal of AND gate U1 is connected to gate driver 13. An output terminal of AND gate U2 is connected to gate driver 23.

Latch circuit 80 outputs LOW in an initial state. When latch circuit 80 outputs LOW, switching element Q1 on/off drives in response to the output from PWM generator 11. When latch circuit 80 outputs LOW, switching element Q2 on/off drives in response to the output from PWM generator 21. When latch circuit 80 outputs HIGH, independent of the outputs from PWM generator 11 and PWM generator 21, switching element Q1 and switching element Q2 are permanently in an off state.

2. Operation of DC-DC Converter 100

Figure 3:
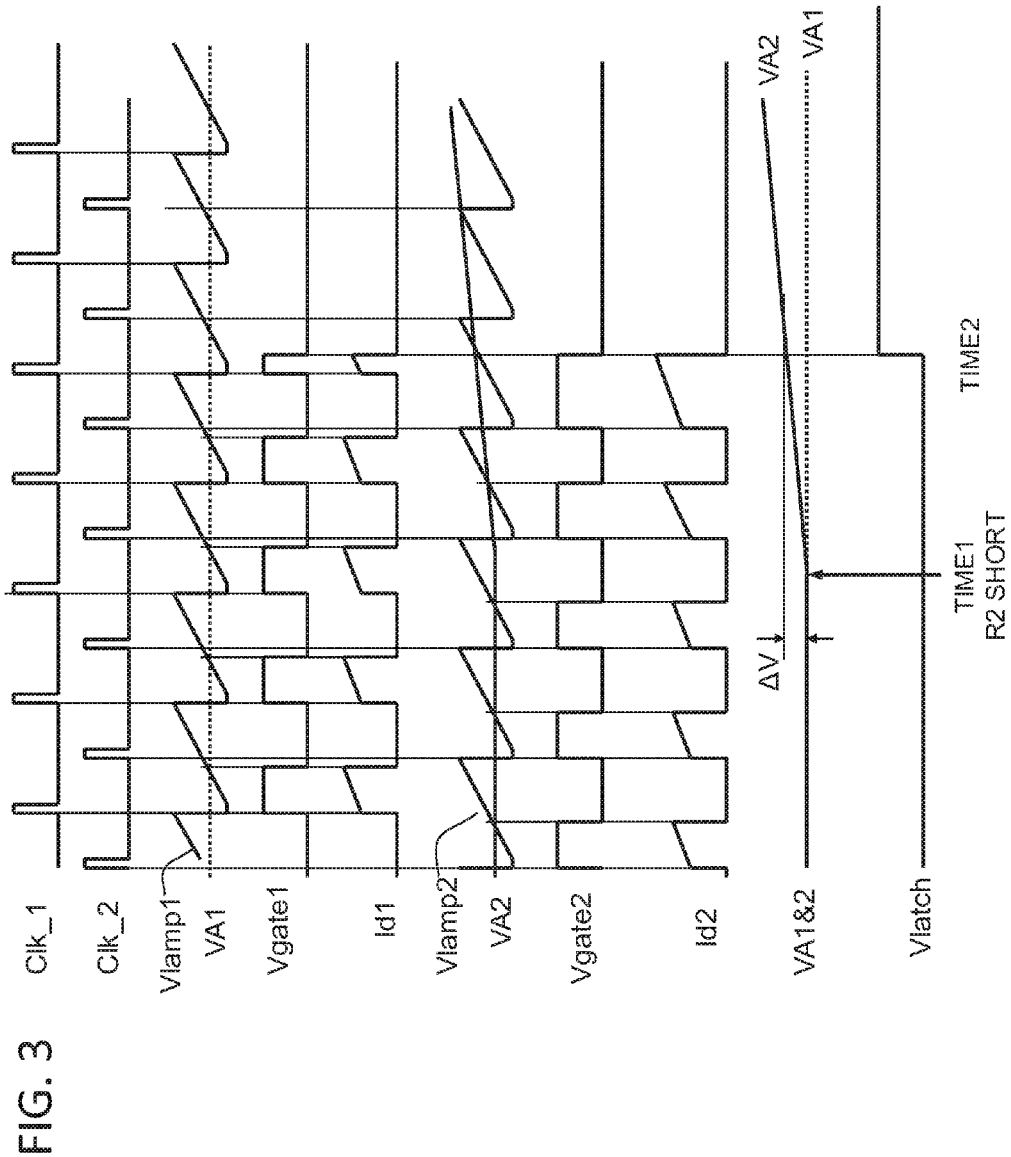
FIG. 3 is a timing chart for explaining an example of an operation by the DC-DC converter.

Next, an operation of DC-DC converter 100 is described using a timing chart in FIG. 3. Firstly, a normal operation of DC-DC converter 100 is described. Waveforms during the normal operation are illustrated as waveforms before TIME1 in the timing chart in FIG. 3. Moreover, the normal operation of DC-DC converter 100 is an operation in a case excluding an abnormal case where at least either one of resistance R1 and resistance R2 is short-circuited.

As illustrated in FIG. 3, oscillator 30 outputs clock signal Clk_1 and clock signal Clk_2 of phases mutually shifted by 180 degrees. A waveform in voltage Vlamp1 that is applied to the non-inverting input terminal of comparator CP1 in PWM generator 11 is a sawtooth waveform that is in synchronization with clock signal Clk_1 and indicates a peak when clock signal Clk_1 is turned ON. A waveform in voltage Vlamp2 that is applied to the non-inverting input terminal of comparator CP2 in PWM generator 21 is a sawtooth waveform that is in synchronization with clock signal Clk_2 and indicates a peak when clock signal Clk_2 is turned ON.

A waveform in gate voltage Vgate1 of switching element Q1 is in synchronization with clock signal Clk_1, voltage Vlamp1, and output voltage VA1 from current error amplifier 61. More specifically, when clock signal Clk_1 is at HIGH and voltage Vlamp1 becomes smaller than voltage VA1, voltage Vgate1 changes from LOW to HIGH. When clock signal Clk_1 is at LOW and voltage Vlamp1 becomes larger than voltage VA1, voltage Vgate1 changes from HIGH to LOW. Similarly, a waveform in gate voltage Vgate2 of switching element Q2 is in synchronization with clock signal Clk_2, voltage Vlamp2, and output voltage VA2 from current error amplifier 62. Accordingly, as illustrated in FIG. 3, the phases of gate voltage Vgate1 of switching element Q1 and gate voltage Vgate2 of switching element Q2 are mutually shifted by 180 degrees. In other words, the switching cycles of converter 10 and converter 20 are shifted by 180 degrees. A waveform in source-drain current Id1 of switching element Q1 indicates a trapezoid waveform the phase of which is the same as the phase of gate voltage Vgate1. A waveform in source-drain current Id2 of switching element Q2 indicates a trapezoid waveform the phase of which is the same as the phase of gate voltage Vgate2.

Although no illustration is made in the timing chart in FIG. 3, control circuit 1 controls the switching operations of the respective phases such that the voltage VA1 and voltage VA2 respectively become zero. In other words, control circuit 1 controls the switching operation of the phase in converter 10 such that the output from current detector 41 matches the output from voltage error amplifier 51. Control circuit 1 controls the switching operation of the phase in converter 20 such that the output from current detector 42 matches the output from voltage error amplifier 51.

Specifically, when output voltage DC OUT becomes smaller than a desired value, the divided voltage value of output voltage DC OUT becomes also smaller than reference voltage Vref. Accordingly, the output from voltage error amplifier 51 becomes large. This results in the large duty ratios of the respective PWM signals outputted from PWM generator 11 and PWM generator 21. As a result, output voltage DC OUT becomes large. When output voltage DC OUT becomes larger than the desired value, the divided voltage value of output voltage DC OUT becomes also larger than reference voltage Vref. Accordingly, the output from voltage error amplifier 51 becomes small. This results in the small duty ratios of the respective PWM signals outputted from PWM generator 11 and PWM generator 21. As a result, output voltage DC OUT becomes small. In this manner, control circuit 1 performs a feedback control such that output voltage DC OUT becomes the desired value corresponding to reference voltage Vref.

Moreover, larger source-drain current Id1 of switching element Q1 results in smaller voltage VA1. This makes the duty ratio of the PWM signal outputted from PWM generator 11 small. As a result, source-drain current Id1 becomes small. The same control is made also in converter 20. In other words, converter 10 and converter 20 are independently controlled.

When the reactance of reactor L1 in converter 10 is equivalent to the reactance of reactor L2 in converter 20, switching element Q1 and switching element Q2 on/off drive with the same duty ratio when DC-DC converter 100 operates normally.

Figure 4:
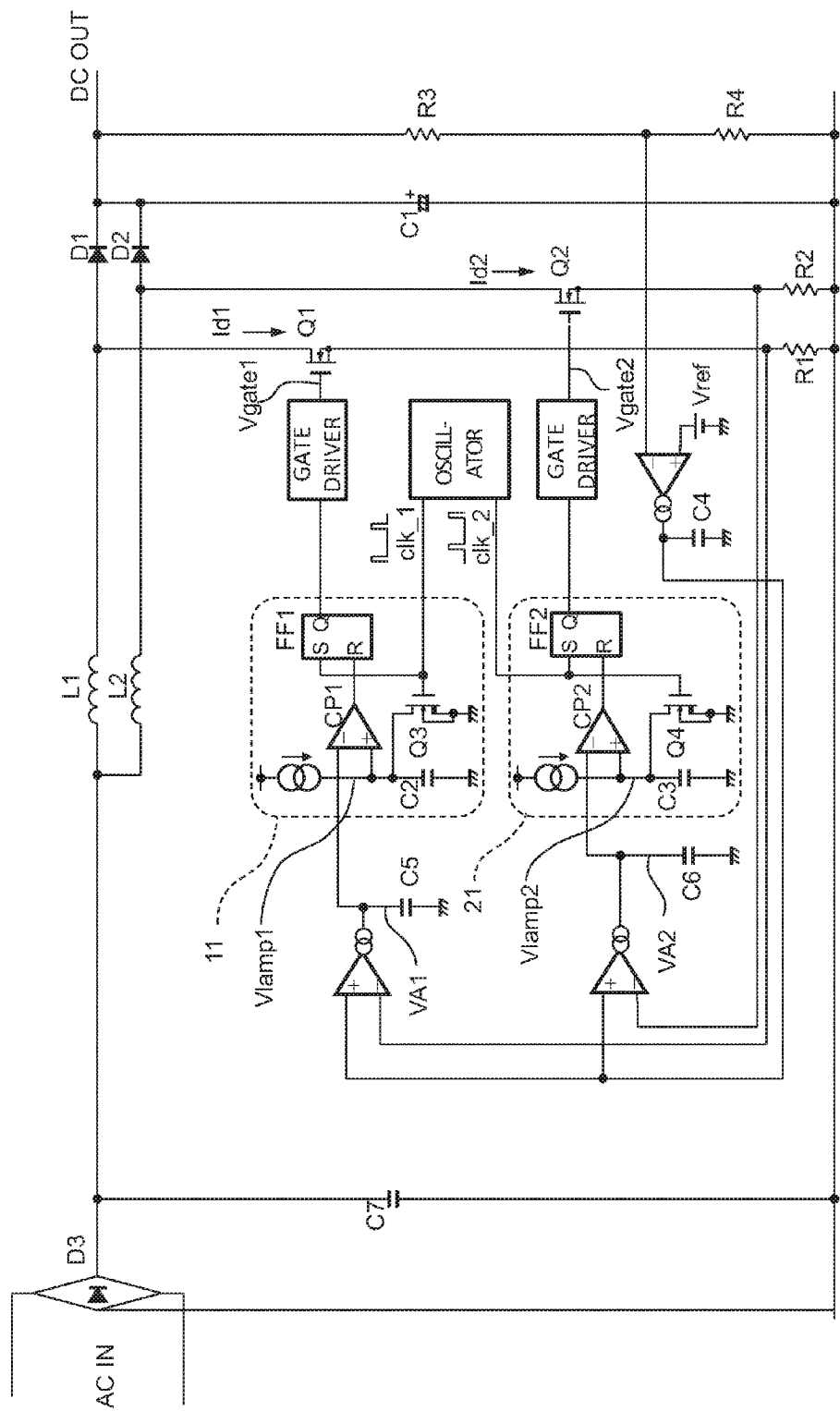
FIG. 4 is a diagram illustrating a circuit example of a DC-DC converter according to a comparative example.
Figure 5:
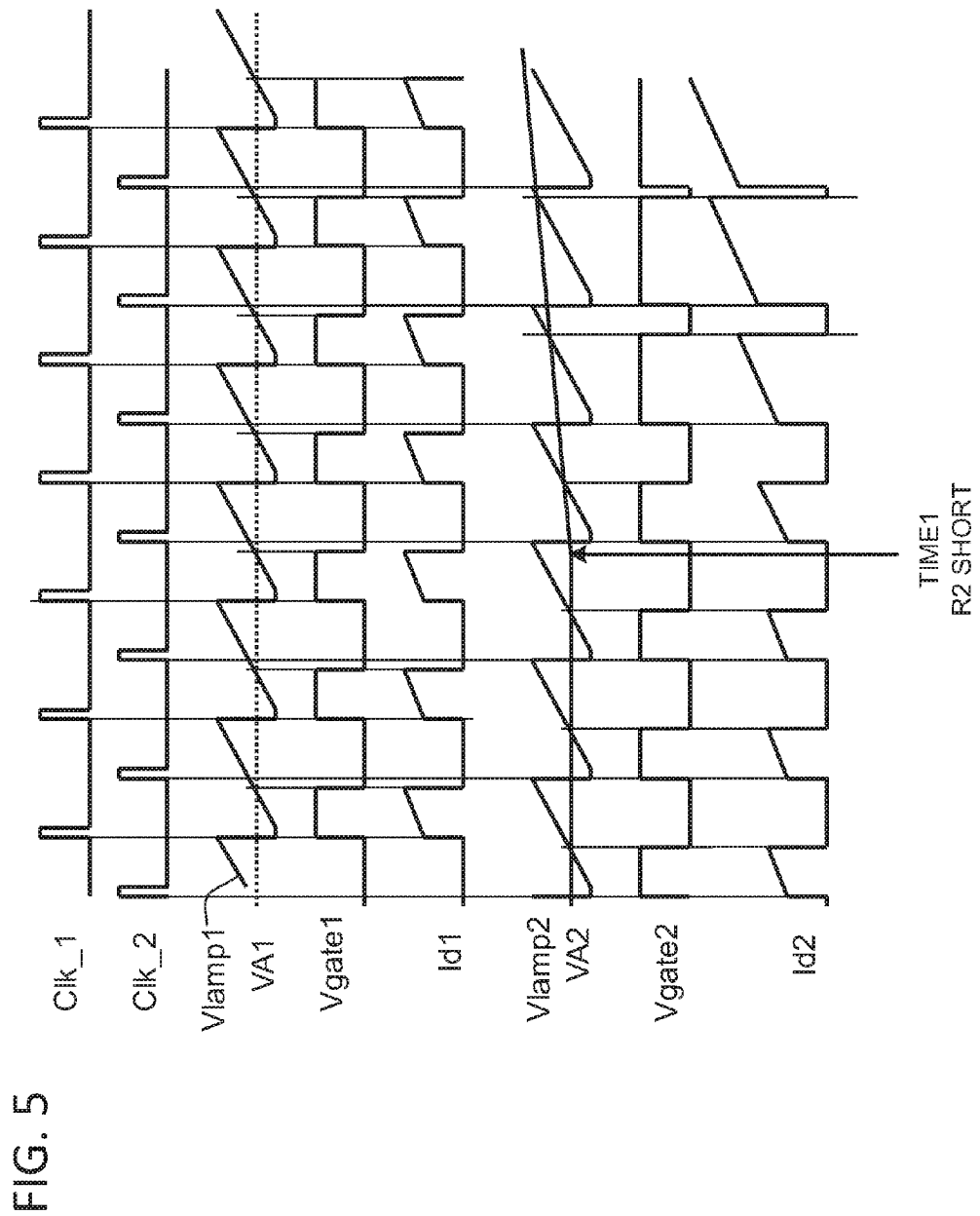
FIG. 5 is a timing chart for explaining an operation by the DC-DC converter in the comparative example.

Next, an abnormal operation of DC-DC converter 100 is described. Waveforms during the abnormal operation are illustrated as waveforms at TIME1 and the subsequent time in the timing chart in FIG. 3. It should be noted that the waveforms explanations of which are omitted are the same as those during the normal operation. FIG. 4 is a diagram illustrating a circuit of a DC-DC converter in a comparative example. FIG. 5 is a timing chart for explaining an example of an operation by the DC-DC converter in the comparative example. The DC-DC converter in the comparative example is different from DC-DC converter 100 in that the DC-DC converter in the comparative example includes no differential detector 70, no latch circuit 80, no AND gate U1, and no AND gate U2. In other words, in the DC-DC converter in the comparative example, respective PWM signals outputted from the respective PWM generators are inputted into the corresponding gate drivers without any change.

As illustrated in FIG. 3 and FIG. 4, when resistance R2 is short-circuited at TIME1, current detector 42 in converter 20 cannot detect the current. As a result, the voltage applied to the inverting input terminal of current error amplifier 62 becomes zero. Accordingly, output voltage VA2 from current error amplifier 62 continuously becomes large. As a result, the duty ratio of a PWM signal outputted from PWM generator 21 and gate voltage Vgate2 that is in synchronization with this PWM signal also continuously become large. As illustrated in FIG. 4, in the DC-DC converter in the comparative example, only switching current Id2 in a booster circuit where the abnormality is generated increased, thereby increasing a loss. Moreover, the DC-DC converter in the comparative example may be broken-down due to generation of heat in some cases.

In contrast with this, when a difference between a feedback signal that is used in converter 10 of the normal phase and a feedback signal that is used in converter 20 of the phase where the abnormality is generated becomes larger than a predetermined threshold voltage ΔV, DC-DC converter 100 causes switching element Q1 and switching element Q2 to be permanently in an off state, thereby preventing increase in loss and breakdown.

More specifically, comparator CP3 in differential detector 70 outputs HIGH when output voltage VA2 from current error amplifier 62 becomes larger by threshold voltage ΔV or more than output voltage VA1 from current error amplifier 61. OR gate U3 outputs a logical addition of the respective outputs from comparator CP3 and comparator CP4. Accordingly, differential detector 70 (OR gate U31) outputs HIGH when a difference between output voltage VA1 and output voltage VA2 is predetermined threshold voltage ΔV or more. In the timing chart in FIG. 3, output voltage VA2 becomes larger by threshold voltage ΔV than output voltage VA1 at TIME2 that is after TIME1, differential detector 70 outputs HIGH to latch circuit 80.

As illustrated in FIG. 3, output voltage Vlatch of latch circuit 80 is continuously at LOW from an initial state that is a normal operation state to TIME2 at which HIGH is inputted from differential detector 70. Output voltage Vlatch of latch circuit 80 outputs HIGH after HIGH is inputted from differential detector 70 (after TIME2). As illustrated in FIG. 3, when output voltage Vlatch becomes HIGH, gate voltages Vgate1 and Vgate2 of switching element Q1 and switching element Q2 permanently become LOW. This causes switching element Q1 and switching element Q2 to be permanently in an off state, and drain-source currents Id1 and Id2 to become permanently zero.

As is in the foregoing, DC-DC converter 100 detects the abnormality of converter 10 and converter 20 and prevents increase in loss and breakdown.

In the abovementioned example, the abnormality of DC-DC converter 100 indicates a case where at least one of resistance R1 and resistance R2 is short-circuited. However, the abnormality of DC-DC converter 100 is not limited to this case. The abnormality of DC-DC converter 100 indicates that a source-drain current of a switching element of any one of the phases cannot be detected. For example, DC-DC converter 100 detects the abnormality even in a case where a path between resistance R1 and current error amplifier 61 is short-circuited to a ground potential.

Moreover, AND gate U1 and AND gate U2 may be respectively disposed in a post stage from gate driver 13 and gate driver 23 such that the output terminal is directly connected to the gate of the corresponding switching element.

Moreover, in the abovementioned example, current detectors 41 and 42 include respectively resistances R1 and R2, but may include any component as long as it can detect the source-drain currents of switching elements Q1 and Q2.

Moreover, when control circuit 1 detects the abnormality, control circuit 1 cuts off a path in a front stage of reactors L1 and L2, instead of causing the gate voltage in switching elements Q1 and Q2 to be zero, thereby permanently stopping the switching operations of converter 10 and converter 20.

Figure 6:
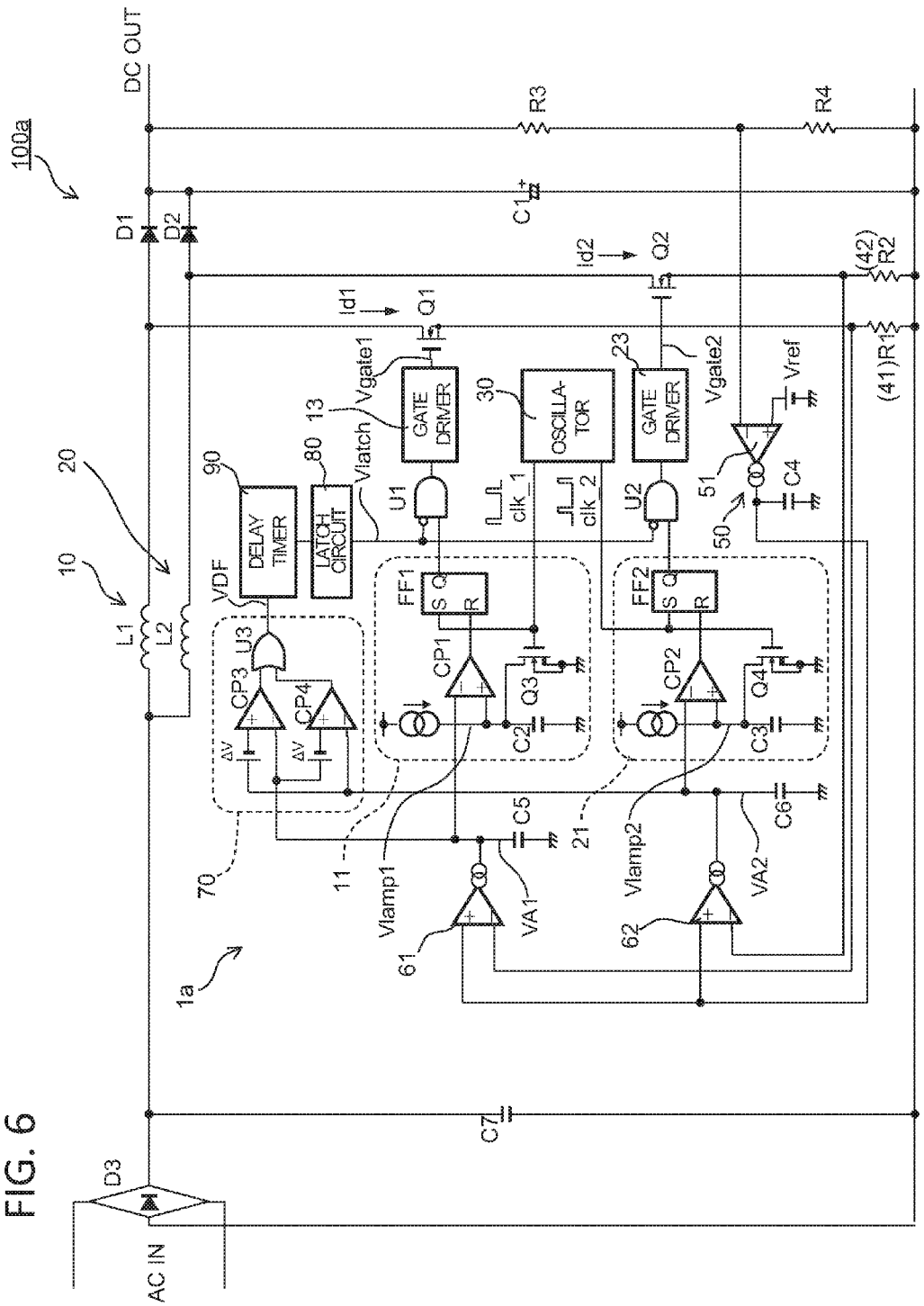
FIG. 6 is a diagram illustrating a circuit example of a DC-DC converter according to one or more embodiments.

Next, DC-DC converter 100a is described with referring to FIG. 6. DC-DC converter 100a is different from DC-DC converter 100 in that control circuit 1a includes delay timer 90.

As illustrated in a circuit example of FIG. 6, control circuit 1a includes delay timer 90 in a path between differential detector 70 and latch circuit 80. Delay timer 90 operates as a low-pass filter circuit that suppresses a high-frequency component in output VDF of differential detector 70. If differential detector 70 continuously outputs HIGH in a predetermined time or longer, delay timer 90 outputs HIGH to latch circuit 80. If the duration time when differential detector 70 continuously outputs HIGH is less than the predetermined time, delay timer 90 continuously outputs LOW to latch circuit 80. It should be noted that delay timer 90 may be implemented as a part of an integrated circuit of control circuit 1a.

Figure 7:
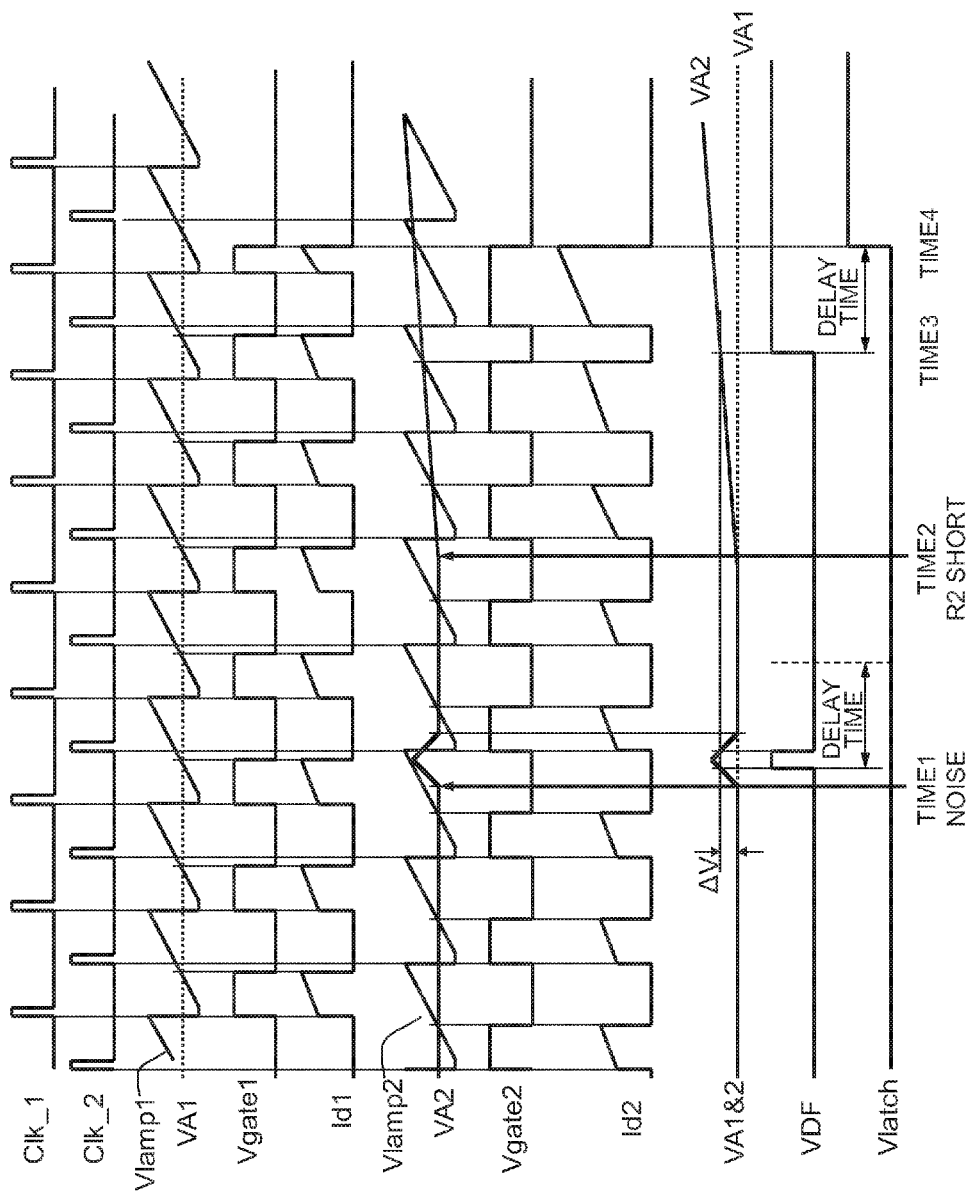
FIG. 7 is a timing chart for explaining example of an operation by the DC-DC converter.

FIG. 7 is a timing chart for explaining an example of an operation of DC-DC converter 100a. As illustrated in FIG. 7, due to a some sort of noise occurred at TIME1, a difference between output voltage VA1 and output voltage VA2 becomes a predetermined threshold voltage ΔV or more. The duration time when difference VDF between output voltage VA1 and output voltage VA2 is continuously the predetermined threshold voltage ΔV or more is shorter than a predetermined delay time. In this case, control circuit 1a does not cause switching element Q1 and switching element Q2 to be permanently in an off state. In other words, control circuit 1a continues the normal operation in this case. As illustrated in FIG. 7, at TIME2, resistance R2 is short-circuited, and at TIME3, difference VDF between output voltage VA1 and output voltage VA2 is a predetermined threshold voltage ΔV or more. Further, also at TIME4 that is elapsed from TIME3 by the predetermined delay time, difference VDF between output voltage VA2 and output voltage VA1 continuously indicates the predetermined threshold voltage ΔV or more. In this case, control circuit 1a causes switching element Q1 and switching element Q2 to be permanently in an off state.

As is in the foregoing, DC-DC converter 100a prevents the switching operations of the phases of converter 10 and converter 20 from erroneously being stopped while preventing increase in loss and breakdown.

Figure 8:
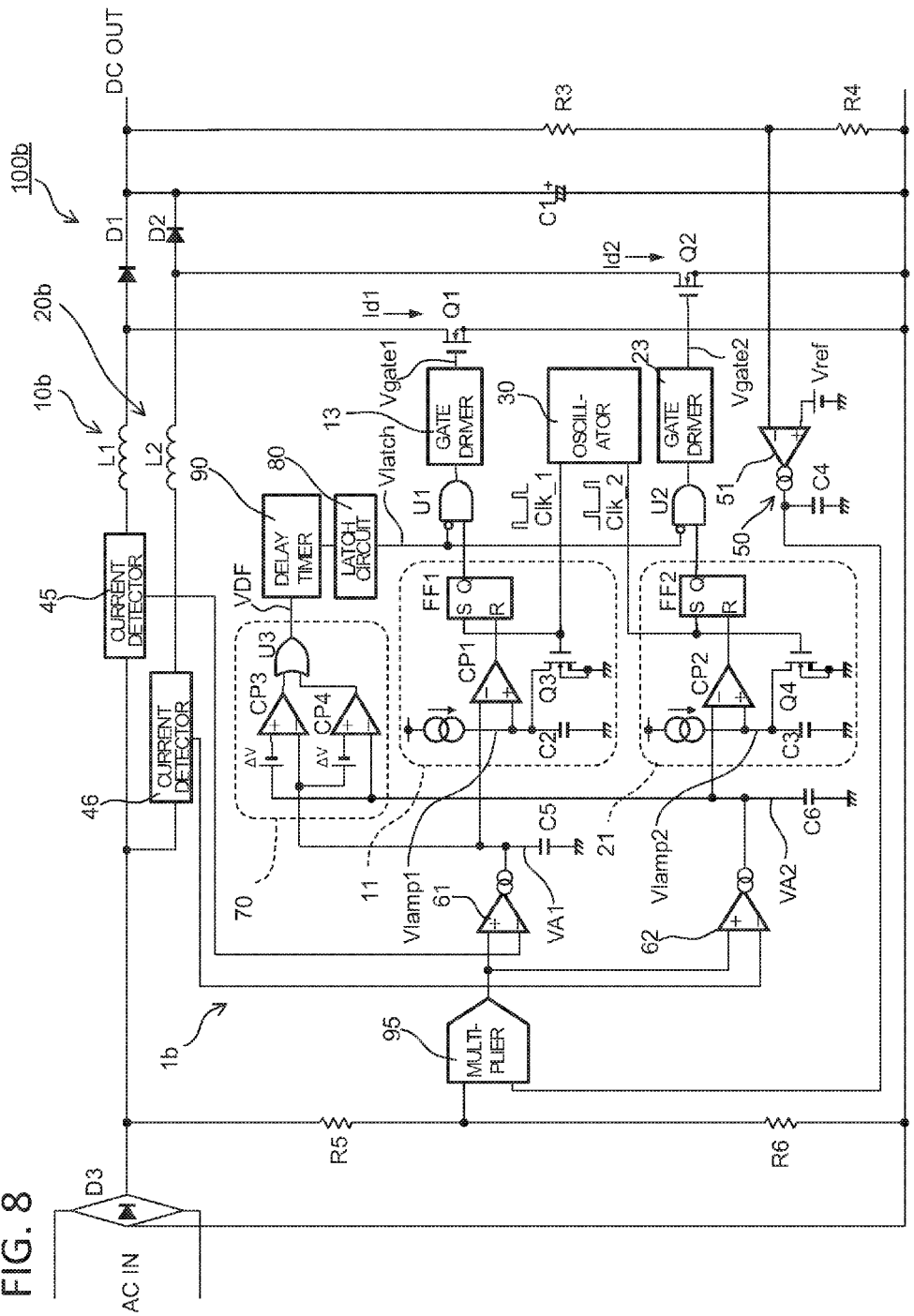
FIG. 8 is a diagram illustrating a circuit example of a DC-DC converter with a power factor correction circuit according to one or more embodiments.

Next, DC-DC converter 100b is described with referring to FIG. 8. FIG. 8 is a diagram illustrating a circuit example of DC-DC converter 100b with a power factor circuit. DC-DC converter 100b is different from DC-DC converter 100 in that DC-DC converter 100b includes control circuit 1b. Control circuit 1b is different from control circuit 1a in that control circuit 1b does not include input side smoothing capacitor C7 but includes resistances R5 and R6 and multiplier 95, and includes current detectors 45 and 46 instead of current detectors 41 and 42.

DC-DC converter 100b includes a power factor circuit (PFC) and controls, by a so-called average current mode control (ACMC), switching operations of converter 10b and converter 20b.

Current detector 45 is serially connected between bridge diode D3 and reactor L1. Although illustration is omitted, current detector 45 includes a smoothing capacitor, and detects an average current of current flowing in reactor L1. Current detector 45 outputs a detection result to the inverting input terminal of current error amplifier 61. Current detector 46 is serially connected between bridge diode D3 and reactor L2. Although illustration is omitted, current detector 46 includes a smoothing capacitor, and detects an average current of current flowing in reactor L2. Current detector 46 outputs a detection result to the inverting input terminal of current error amplifier 62.

The output from output voltage detection circuit 50 is inputted into one of input terminals of multiplier 95. The DC voltage rectified by diode D3 is divided by resistance R5 and resistance R6. The divided DC voltage is inputted into the other input terminal of multiplier 95. Moreover, the output terminal of multiplier 95 is connected to the non-inverting input terminal of current error amplifier 61 and the non-inverting input terminal of current error amplifier 62.

DC-DC converter 100b using the average current mode control detects the abnormality of converter 10b and converter 20b and prevents increase in loss and breakdown.

Figure 9:
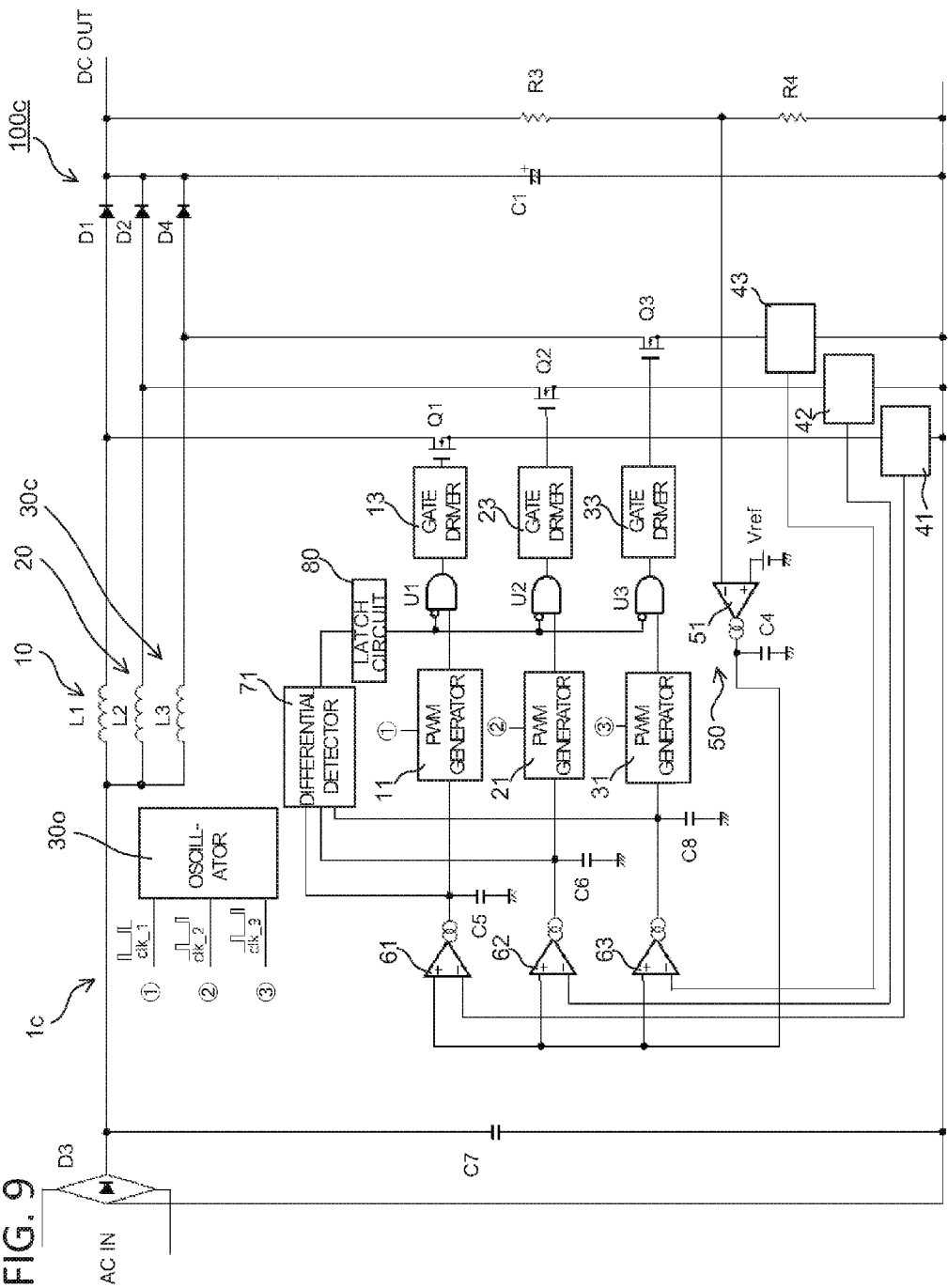
FIG. 9 is a diagram illustrating a circuit block of a DC-DC converter according to one or more embodiments.

Although two-phase interleaved DC-DC converters 100, 100a, and 100b are explained in the abovementioned examples, the invention is not limited to the two-phase interleaved DC-DC converter. FIG. 9 is a diagram illustrating a circuit example of the DC-DC converter 100c. DC-DC converter 100c is a three-phase interleaved DC-DC converter.

As illustrated in FIG. 9, DC-DC converter 100c includes converter 30c, in addition to converter 10 and converter 20. Converter 30c includes reactor L3, switching element Q3, current detector 43, current error amplifier 63, PWM generator 31, AND gate U3, and gate driver 33. The output terminal of current error amplifier 63 is grounded via capacitor C8, and is connected to PWM generator 31. Control circuit 1c of DC-DC converter 100c includes oscillator 30o and differential detector 71. Oscillator 30o and differential detector 71 are shared by converter 10, converter 20, and converter 30c.

Three-phase interleaved DC-DC converter 100c performs, based on clock signals Clk_1, Clk_2, and Clk_3 of phases mutually shifted by 120 degrees, switching operations with the phases that are mutually shifted by 120 degrees. For an explanation herein, a phase of converter 10 that performs a switching operation based on clock signal Clk_1 is referred to as an A phase, a phase of converter 20 that performs a switching operation based on clock signal Clk_2 is referred to as a B phase, and a phase of converter 30c that performs a switching operation based on clock signal Clk_3 is referred to as a C phase.

Figure 10:
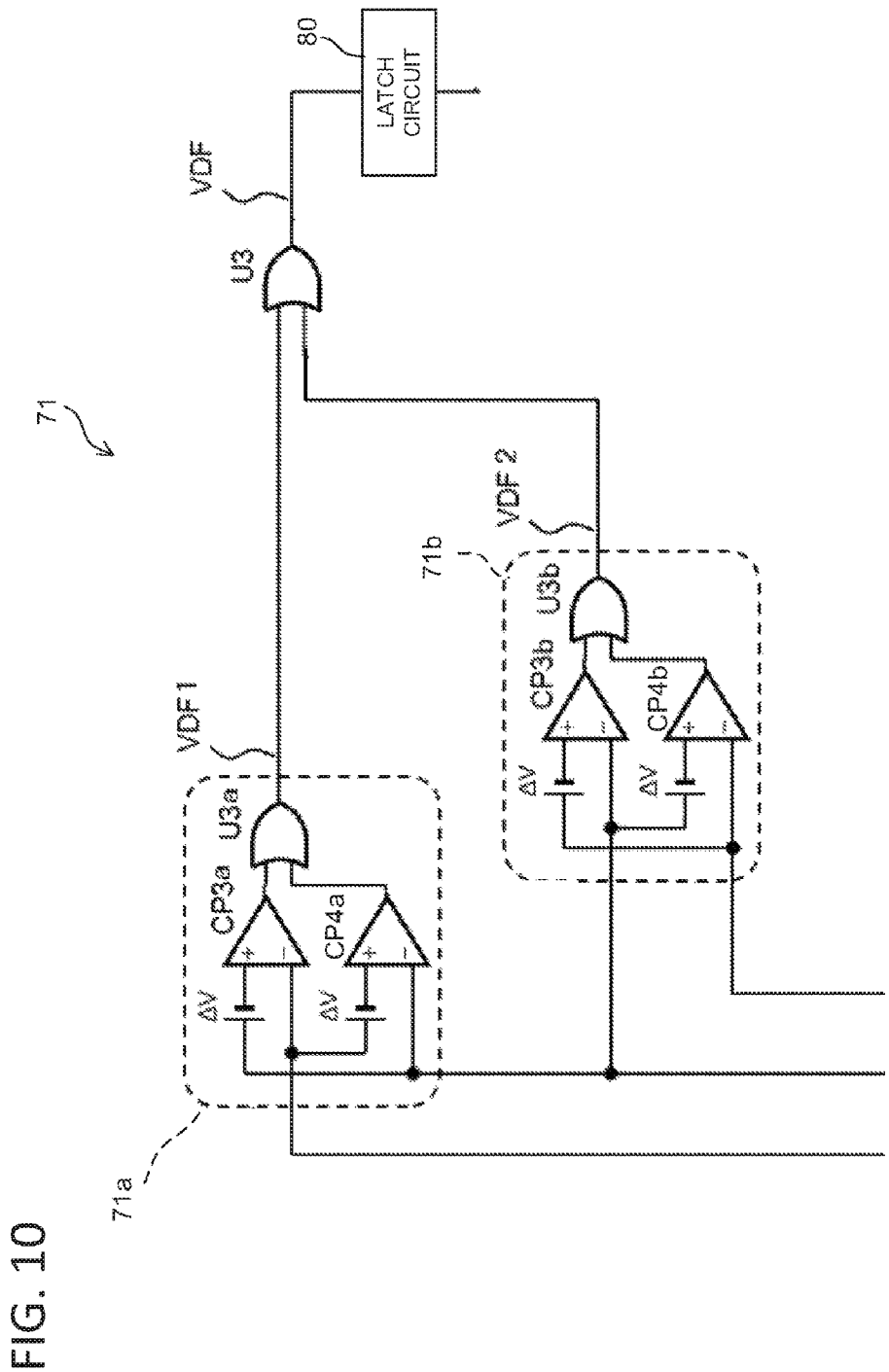
FIG. 10 is a diagram illustrating a circuit example of a differential detector of the DC-DC converter.

As illustrated in FIG. 10, differential detector 71 includes comparison unit 71a, comparison unit 71b, and OR gate U3.

Comparison unit 71a includes comparator CP3a, comparator CP4a, and OR gate U3a. Comparator CP3a compares the voltage in a feedback signal of the A phase with the voltage that is smaller by threshold voltage ΔV than the voltage in a feedback signal of the B phase. Comparator CP4a compares the voltage in a feedback signal of the B phase with the voltage that is smaller by threshold voltage ΔV than the voltage in a feedback signal of the A phase. The output from comparator CP3a and the output from comparator CP4a are inputted into OR gate U3a. OR gate U3a outputs a logical addition of two inputs to OR gate U3 as an output VDF1.

Comparison unit 71b includes comparator CP3b, comparator CP4b, and OR gate U3b. Comparator CP3b compares the voltage in a feedback signal of the B phase with the voltage that is smaller by threshold voltage ΔV than the voltage in a feedback signal of the C phase. Comparator CP4b compares the voltage in a feedback signal of the C phase with the voltage that is smaller by threshold voltage ΔV than the voltage in a feedback signal of the B phase. Output VDF1 from comparator CP3b and output VDF2 from comparator CP4b are inputted into OR gate U3b. OR gate U3b outputs a logical addition of two inputs VDF1 and VDF2 to OR gate U3 as an output VDF2.

Here, differential detector 71 can detect such abnormality that at least one of current detectors 41 to 43 is short-circuited without including a comparison unit that compares respective feedback signals of the A phase and the C phase.

It should be noted that a four-phase interleaved DC-DC converter can detect an abnormality in any of phases by including only two comparison units. A five-phase interleaved DC-DC converter can detect an abnormality in any of phases by including only three comparison units. In other words, an N-phase interleaved DC-DC converter can detect an abnormality in any of N-phases by including comparison units the number of which is an integer obtained by rounding up N/2.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An interleaved DC-DC converter for converting a first voltage of a DC input power supply into a second voltage and outputs the second voltage, the interleaved DC-DC converter comprising:
    N (where N is an integer of 2 or more) boost converters that are connected in parallel, switching cycles of the N converters being mutually shifted by 1/N phase;
    a smoothing capacitor that is connected to an output terminal; and
    a control circuit that independently controls switching operations of the N converters, wherein
    each of the N converters includes a series circuit of a reactor, a switching element, and a current detector, and a node between the reactor and the switching element is connected to the smoothing capacitor via a corresponding diode, and
    the control circuit includes:
        an output voltage detection circuit that detects a voltage of the smoothing capacitor, compares the detected voltage with a reference voltage, and outputs a comparison result as an error signal;
        a single oscillator that provides clock signals of mutually different phases to the N converters, the oscillator being common in the N converters;
        N PWM generators that respectively generate pulses that on/off drive the switching elements of the N converters;
        N current error amplifiers that compare current signals detected by the respective current detectors with the error signal outputted from the output voltage detection circuit, and that outputs comparison results as feedback signals to the respective PWM generators;
        a differential detector that detects a difference between one feedback signal and another feedback signal for each of the feedback signals; and
        a latch circuit that stops all the switching operations of the N converters when the differential detector detects that any one of the differences is a predetermined threshold value or more.

2. A semiconductor device comprising
the interleaved DC-DC converter according to claim 1, wherein
the switching elements, the diodes, and the control circuit are implemented as an integrated circuit.

3. The interleaved DC-DC converter according to claim 1, wherein the differential detector includes M (where M is an integer smaller than N) comparison units that respectively compare differences between M pairs of feedback signals, out of the N feedback signals, with the predetermined threshold value, and
an OR gate into which outputs from the M comparison units are inputted.

4. The interleaved DC-DC converter according to claim 3, wherein the M is an integer obtained by diving the N by 2 and by rounding up.

5. The interleaved DC-DC converter according to claim 1, further comprising:
    a delay timer that is connected between the latch circuit and the differential detector, wherein
    the delay timer causes the latch circuit to output a signal to stop all the switching operations of the N converters when the differential detector continuously detects that any one of the differences is the predetermined threshold value or more for a predetermined time or longer.

6. The interleaved DC-DC converter according to claim 1, wherein the latch circuit stops all the switching operations of the N converters when at least one of the current detectors fails to detect a current.

7. The interleaved DC-DC converter according to claim 1, wherein the latch circuit stops all the switching operations of the N converters by making gate voltages of the respective switching elements be zero.

8. The interleaved DC-DC converter according to claim 1, further comprising:
    N AND gates each including an output terminal connected to a gate of a corresponding one of the switching elements, one of input terminals connected to a corresponding one of the PWM generators, and the other input terminal connected to an inversion of an output of the latch circuit, wherein
    the latch circuit outputs LOW in an initial state, and outputs HIGH when the differential detector detects that any one of the differences is the predetermined threshold value or more.

9. The interleaved DC-DC converter according to claim 1, wherein each of the switching elements is a MOSFET.

10. An interleaved DC-DC converter in which N (where N is an integer of 2 or more) boost DC-DC converters are connected in parallel, the interleaved DC-DC converter comprising:
    N PWM generators that respectively output PWM signals to N switching elements included in the N DC-DC converters;
    a voltage error detection circuit that detects a difference between an output voltage after conversion and a reference voltage;
    N current detection circuits that respectively detect currents of the N switching elements;
    N current error amplifiers that output feedback signals for adjusting duty ratios of the PWM signals, to the PWM generators such that the currents detected by the respective current detection circuits and the difference detected by the voltage error detection circuit become zero;
    a difference detection circuit that detects a difference between one feedback signal and another feedback signal, for each of the feedback signals; and
    a control circuit that permanently stops switching operations of the N DC-DC converters when any one of the differences detected by the difference detection circuit is a predetermined threshold value or more.

11. The interleaved DC-DC converter according to claim 10, wherein
the difference detection circuit includes
M comparators that compare a predetermined threshold and each of differences between different pairs of feedback signals, and
a single OR gate into which outputs from the M comparators are inputted, wherein the M is an integer smaller than the N.

12. The interleaved DC-DC converter according to claim 11, wherein the M is an integer obtained by dividing the N by 2 and then rounding up.

13. The interleaved DC-DC converter according to claim 11, wherein
the control circuit includes:
a latch circuit into which an output from the OR gate is inputted and that outputs LOW in an initial state; and
N AND gates each including an output terminal connected to a gate of a corresponding one of the switching elements, one of input terminals connected to a corresponding one of the PWM generators, and the other input terminal connected to an inversion of an output of the latch circuit, and
the latch circuit outputs HIGH when the OR gate of the difference detection circuit outputs HIGH.

14. The interleaved DC-DC converter according to claim 13, further comprising:
N gate drivers that are respectively connected between the output terminals of the N AND gates and the gates of the N switching elements.

15. The interleaved DC-DC converter according to claim 13, wherein
the control circuit includes a filter circuit connected between the OR gate and the latch circuit, and
the filter circuit attenuates a high-frequency component in the output from the OR gate.

16. The interleaved DC-DC converter according to claim 10, wherein
outputs from the respective current error amplifiers are inputted into the difference detection circuit.

17. A semiconductor device comprising
the interleaved DC-DC converter according to claim 10, wherein
the switching elements and the control circuit are implemented as an integrated circuit.

* * * * *